US011156976B2

(12) United States Patent
Berger (10) Patent No.: US 11,156,976 B2
(45) Date of Patent: Oct. 26, 2021

(54) METHOD FOR OPERATING A PLURALITY OF TECHNICAL UNITS AS A POOL ON AN ELECTRIC DISTRIBUTION NETWORK, CONTROLLER, AND ELECTRIC DEVICE

(71) Applicant: Bayerische Motoren Werke Aktiengesellschaft, Munich (DE)

(72) Inventor: Jens Berger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 138 days.

(21) Appl. No.: 16/705,420

(22) Filed: Dec. 6, 2019

(65) Prior Publication Data

US 2020/0110378 A1 Apr. 9, 2020

Related U.S. Application Data

(63) Continuation of application No. PCT/EP2018/062478, filed on May 15, 2018.

(30) Foreign Application Priority Data

Jun. 9, 2017 (DE) .................... 10 2017 209 801.5

(51) Int. Cl.
    *G05B 19/042* (2006.01)
(52) U.S. Cl.
    CPC .... *G05B 19/042* (2013.01); *G05B 2219/2639* (2013.01)
(58) Field of Classification Search
    CPC . G05B 19/042; G05B 2219/2639; H02J 3/00; G06Q 50/06; G06Q 10/06
    See application file for complete search history.

(56) References Cited

U.S. PATENT DOCUMENTS 8,583,520 B1* 11/2013 Forbes, Jr. .............. H04L 69/22
                                                            705/34
9,728,976 B2* 8/2017 Dykeman ......... H02J 13/00017
(Continued)

FOREIGN PATENT DOCUMENTS

GB          2506401 A     4/2014

OTHER PUBLICATIONS

Garcia-Torres, Felix, and Carlos Bordons. "Optimal economical schedule of hydrogen-based microgrids with hybrid storage using model predictive control." IEEE Transactions on Industrial Electronics 62.8 (2015): 5195-5207. (Year: 2015).*

(Continued)

*Primary Examiner* — Michael D Masinick
(74) *Attorney, Agent, or Firm* — Crowell & Moring LLP (57) ABSTRACT

A method for operating a plurality of technical units as a pool on an electric distribution network. A central controller is used to receive flexibility data from each technical unit. The flexibility data is used by the unit to indicate a power interval within which the electric power of the unit is allowed to vary or varies in an expected manner. Depending on a specified optimization target of the pool, an individual non-binding stimulus function is ascertained for each unit from the flexibility data of each unit and is provided to the respective unit. In response to the individual stimulus function, a respective schedule which describes a time curve of the power exchange planned according to a local optimization target of the unit is then received from each unit, and an overall schedule for the pool is generated from the schedules of the units.

11 Claims, 6 Drawing Sheets

(56) References Cited

U.S. PATENT DOCUMENTS

| | | | | |
|---|---|---|---|---|
| 2003/0144864 A1* | 7/2003 | Mazzarella | ............ | H02J 3/004 705/412 |
| 2008/0040295 A1* | 2/2008 | Kaplan | .................... | H02J 3/38 705/412 |
| 2008/0046387 A1 | 2/2008 | Gopal et al. | | |
| 2011/0015799 A1 | 1/2011 | Pollack et al. | | |
| 2013/0345884 A1 | 12/2013 | Forbes, Jr. | | |
| 2014/0094983 A1* | 4/2014 | Dykeman | ................ | H02J 4/00 700/295 |
| 2014/0094984 A1* | 4/2014 | Dykeman | ........ | H02J 13/00017 700/295 |
| 2017/0131331 A1* | 5/2017 | Storace | .................... | H02J 3/14 |

OTHER PUBLICATIONS

Fathima, A. Hina, and K. Palanisamy. "Optimization in microgrids with hybrid energy systems—A review." Renewable and Sustainable Energy Reviews 45 (2015): 431-446. (Year: 2015).*

Su, Wencong, Jianhui Wang, and Jaehyung Roh. "Stochastic energy scheduling in microgrids with intermittent renewable energy resources." IEEE Transactions on Smart grid 5.4 (2013): 1876-1883. (Year: 2013).*

International Search Report (PCT/ISA/210) issued in PCT Application No. PCT/EP2018/062478 dated Jun. 22, 2018 with English translation (five pages).

German-language Written Opinion (PCT/ISA/237) issued in PCT Application No. PCT/EP2018/062478 dated Jun. 22, 2018 (six pages).

German-language Search Report issued in counterpart German Application No. 10 2017 209 801.5 dated May 3, 2018 with partial English translation (11 pages).

Eid et al., "Time-based pricing and electricity demand response: Existing barriers and next steps", Utilities Policy 40, 2016, pp. 15-25, Elsevier (11 pages).

Sundstroem et al., "Planning Electric-Drive Vehicle Charging under Constrained Grid Conditions", Proceedings of the 2010 International Conference on Power System Technology, 2010, pp. 1-6 (seven pages).

* cited by examiner

METHOD FOR OPERATING A PLURALITY OF TECHNICAL UNITS AS A POOL ON AN ELECTRIC DISTRIBUTION NETWORK, CONTROLLER, AND ELECTRIC DEVICE

CROSS REFERENCE TO RELATED APPLICATIONS

This application is a continuation of PCT International Application No. PCT/EP2018/062478, filed May 15, 2018, which claims priority under 35 U.S.C. § 119 from German Patent Application No. 10 2017 209 801.5, filed Jun. 9, 2017, the entire disclosures of which are herein expressly incorporated by reference.

BACKGROUND AND SUMMARY OF THE INVENTION

The invention relates to a method for operating a plurality of technical units as a composite pool on an electrical distribution network. In electrical power economics, a technical unit is also referred to as an asset. As a result of the distribution as a pool, a pool-wide optimization target for the technical units is achieved by and large. The invention also includes a control apparatus for centrally controlling the technical units and also an electrical apparatus that can be operated as a technical unit in said pool.

A distribution network can have electrical loads, electrical sources and/or electrical energy stores connected to it, in each case as a technical unit via a respective network connection. Each technical unit can therefore exchange electrical power with the distribution network via the network connection. In this context, exchange thus means both drawing electrical power and supplying electrical power. Multiple such technical units can be attuned or coordinated to one another in respect of their operation, which means that, for the purposes of the invention, they are a pool by virtue of their each attuning their "schedule", that is to say the time characteristic of a planned power exchange, to the schedule of the other technical units of the pool. By and large, the pool therefore acts as one big technical unit in the distribution network. Within the context of the operation of electrical energy sources as a pool, the term virtual power station is also known.

To coordinate multiple technical units, US 2011/0015799 A1 discloses a central control apparatus that collects operating data from the technical units of a pool. Subsequently, the central control apparatus controls the individual technical units in regard to the electrical power that they are supposed to exchange with the distribution network.

However, there are technical units, such as for example for cogeneration, that often need to be operated as needed, that is to say are controlled manually on the basis of local needs and/or premises, in order to keep the technical constraints of the installation, for example the operating temperature, within a predetermined range. In the case of a source for renewable energy, the energy generation is weather-dependent, i.e. in this case a remote control cannot simply draw a prescribed power. If there is too much energy available, it needs to be delivered to the distribution network, even though there may not be any need therefor in accordance with the central control. This leads to unnecessary strain on the distribution network.

Local, volatile energy generation is increasing further, however. The flexibility of energy generation and energy use is therefore fundamental. In this case, it is difficult to optimize a pool, that is to say a plurality of technical units, as a whole for a predetermined pool-wide optimization target, while at the same time every single technical unit needs to be operated according to local optimization targets of their own. A local optimization target can for example provide for maximizing the individual consumption of generated energy, minimizing the network purchase of electrical power, minimizing wear or maximizing supply to the network, in order to be able to sell energy on an energy market. This can be inconsistent with a pool-wide optimization target, for example minimizing the costs for overall operation of the pool or minimizing $CO_2$ emissions, or maximizing the proportion of renewable energies.

US 2013/0345884 A1 discloses a method in order to control a pool of technical units. In this case, there is provision for local control, to which each technical unit contributes individually.

Pool-wide optimization for a pool of technical units is known from US 2008/0046387 A1. In this case, however, it is difficult to achieve an integral, pool-wide optimization target that is also consistent with the local optimization target of each technical unit. As such, the pool-wide optimization also requires the ability to react to changes in the premises or constraints of every single technical unit, such as for example the availability thereof on the distribution network. A learnt behavior of the technical unit, that is to say a forecast for future behavior, should also be able to be taken into consideration.

GB 2 506 401 A discloses that the need for electrical energy that a pool comprising multiple electrical devices has vis-à-vis a network can be optimized by taking into consideration both a global cost function for the whole pool and individual cost functions for the individual electrical devices. The starting point in this case is a first global optimization step, which produces global "internal state information" that is then transmitted to the individual devices, which then perform a respective local optimization step by taking into consideration the global internal state information, resulting in local "internal state information" that is in turn supplied to the next iteration of the global optimization step. As a result, the desired optimum operating point for the individual devices is iteratively ascertained.

The invention is based on the object of operating a plurality of technical units as a composite pool on a distribution network to the effect that the operation of the individual technical units can proceed according to an individual, unit-specific optimization target and still a pool-wide optimization target can also be met for the pool.

The invention provides a method by which a plurality of technical units can be operated as a pool on an electrical distribution network. To this end, the technical units can be electrically coupled by way of the distribution network in a known manner via a respective network connection in order to exchange electrical power. Another term for such a distribution network is also an energy network. Additionally, the distribution network can also have pool-external technical units connected to it, for example at least one power station and/or at least one electrical load.

In order to operate the technical units as a pool, that is to say by and large to meet a pool-wide optimization target on the basis of the technical units, a central control apparatus performs at least one coordination cycle. Such a coordination cycle involves the following steps being performed. Respective flexibility data are received from each technical unit. Using the flexibility data, the respective technical unit indicates, for at least one time interval, a respective power range within which an electrical power exchanged between the unit and the distribution network is permitted to vary or will probably vary. Thus, the flexibility that the technical unit has or can provide for the power exchange, or else a forecast of the probable variation e.g. in the case of a volatile energy generator (wind turbine or solar installation), is indicated. The power range describes a power band indicating the minimum and maximum powers between which the power exchange can be flexibly adjusted in a predetermined future time interval. The flexibility can also be 0, in which case a unique characteristic is indicated for the time interval. Preferably, however, the power range is greater than 0.

The power range is a power band, i.e. in the case of a technical unit having flexibility it indicates multiple possible power values for a given time. In the case of a technical unit without flexibility, on the other hand, the power range indicates a respective actual forecast value for the at least one time interval. If the technical unit is thus able to perform only one actual schedule, then this is reported. In this case, the power range has thus degenerated to a single value per increment interval. Said value is formed from forecast values for the respective increment intervals. The forecast values can be ascertained from historical power data of the unit in a manner known per se.

From the respective flexibility data of each unit, the central control apparatus ascertains at least one respective individual stimulus function for each unit on the basis of a predetermined, pool-wide optimization target of the pool and provides said stimulus function to the respective unit. The stimulus function indicates for the at least one time interval indicated by the unit a respective time characteristic of a predetermined orientation variable so that the unit can plan the power exchange. The pool-wide optimization target can provide for minimization of the disbursed energy costs and/or of the $CO_2$ emissions and/or maximization of the portion of renewable energies for the pool as a whole, that is to say when calculated over all units. For each orientation variable, for example energy costs and/or $CO_2$ emissions and/or proportion of renewable energies, any stimulus function indicates a time characteristic that results from the matching of the flexibility data, i.e. the time intervals and the power intervals indicated therein. Therefore, the stimulus function can consist of an indication of costs, $CO_2$, proportion of renewable energies, power, in each case over time. If for example a first technical unit requires electrical power in a given time interval and this electrical power can be provided by a second technical unit of the pool only in a subrange of the time interval, then for this subrange of the time interval the stimulus functions for the two technical units are adjusted such that it is cheaper for the first technical unit to draw the power in this subrange of the time interval and for the second technical unit to provide the power in this subrange of the time interval. The reason is that in this way the power transmission can take place internally in the pool, which e.g. decreases the purchase costs for pool-external energy as a whole for the pool.

On the basis of the at least one stimulus function that each unit receives, this unit can then plan the time characteristic of its power exchange for the future. The stimulus function can be treated as nonbinding in this case, however. The central control apparatus then finally receives a respective schedule from the technical unit from every unit as a response to the at least one individual stimulus function. The schedule describes, for the at least one time interval indicated by the unit, a time characteristic of the power exchange planned thereby. By way of example, the time characteristic can indicate the respective value of the power to be exchanged in a time frame of 15 minutes. Another term for such a schedule is also power plan. The planning of the schedule can be performed by the technical unit in accordance with a local optimization target of the unit. The stimulus function is thus not an imperative stipulation, but rather only a constraint that the technical unit takes into consideration when planning the schedule, e.g. the costs, but with the local optimization target also being borne in mind, that is to say for example the minimization of wear.

The central control apparatus then thus contains the schedules for the future time intervals from the units. From the schedules of all the units, the control apparatus then forms an overall schedule for the pool. The overall schedule can be formed by balancing the schedules and indicates what power exchange the pool as a whole needs to perform with at least one pool-external technical unit in order to equalize its power balance. The power exchange with the at least one pool-external technical unit then therefore takes place such that the power balance within the pool is equalized, that is to say as much power is available in the pool at any time as is used.

The invention results in the advantage that each technical unit can individually independently plan its schedule and can independently switch itself, and hence local operating premises or operating conditions of each unit can also be heeded by said unit in the schedule. Nevertheless, the stimulus functions are used to coordinate the technical units to the effect that they orient their schedule to the pool-wide optimization target.

The invention also includes developments, the features of which result in additional advantages.

A time interval that a technical unit indicates in its flexibility data can be for example in a range from 20 minutes to 24 hours. By contrast, in accordance with one development of the invention, said stimulus function encompasses the characteristic of the orientation variable (e.g. costs) for increment intervals of a predetermined time frame, so that a time series with a respective value of the orientation variable per increment interval is obtained. The increment intervals can each be for example in a range from 5 minutes to 25 minutes, for example 15 minutes. For each increment interval, there is then thus a value for the orientation variable.

A technical unit can be sent a single stimulus function or else a combination of multiple stimulus functions. One development provides for the respective orientation variable of the at least one stimulus function to be one of the following: monetary costs, $CO_2$ consumption, a proportion of regenerative energy. A possible other stimulus function provides for the orientation variable to be a proposed, actual or unique power value for a power plan or schedule. In other words, the control apparatus can also propose a schedule as a stimulus function.

The pool-wide optimization target, that is to say the optimization target of the pool as a whole, can also relate to said orientation variables, that is to say can take one or more of them into consideration. In accordance with one development, the optimization target of the pool is therefore selected based on the respective orientation variable to the effect that said optimization target provides for the orientation variable to be set to a value within a predetermined time interval for the pool as a whole, that is to say based on the pool. In other words, the optimization target of the pool, based on the respective orientation variable, provides for the orientation variable to be put or taken into a predetermined target range on a pool-wide basis. The target range can be defined by the minimum value or the maximum value or by virtue of the orientation variable being set to a value less than the threshold value or greater than the threshold value.

This is naturally dependent on the chosen orientation variable. Monetary costs and CO2 consumption must be adjusted to be below a threshold value, or minimized, in this case. The proportion of regenerative energy then naturally provides for maximization or adjustment to a value greater than the threshold value.

In accordance with one development, the flexibility data additionally contain a constraint indicating the total amount of energy that needs to be exchanged by the power exchange in the at least one time interval. The total energy that needs to result from the power exchange is thus indicated. As such, it is possible to ensure for example that a technical unit obtains or delivers the amount of energy at the end of the at least one time interval. An actual example of such a constraint is provided in the case of an electrically drivable motor vehicle that is connected to the distribution network for a predetermined connection period for charging purposes, where the actual charging process requires less time than the total time for which the motor vehicle is connected, however. Therefore, the power can thus be varied over the connection period so long as, as a constraint, the amount of energy for charging the battery of the motor vehicle can be obtained at the end of the connection period.

The steps described hitherto result in an individual coordination cycle. Such a coordination cycle can be performed when operation of the units in the pool is initialized. Additionally or alternatively, a coordination cycle can be performed whenever the technical units operated in the pool change. If for example a technical unit needs to be shut down, then a coordination cycle can achieve the effect that the other technical units adapt their schedules so that the pool-wide optimization target can continue to be achieved. However, it is also possible for example for changes to arise in the costs for energy that the pool needs to obtain from a pool-external source or that the pool needs to deliver to a pool-external buyer. In general, it is thus likewise possible for a coordination cycle to be performed when the at least one orientation variable, that is to say for example the costs, changes. As a result, the units then adapt their schedules to the changed orientation variable.

In the case of the at least one technical unit, the local optimization target can encompass taking into consideration of a local stipulation or premise, in the manner stated. A local stipulation of this kind can indicate a switching time to be observed (off time and/or on time) and/or a minimization of wear and/or a maximum permissible noise level. The local optimization target can additionally or alternatively relate to one of said orientation variables. As a result of a local optimization target of this kind being taken into consideration by the technical unit itself, the central control apparatus does not need to know and take into consideration the respective local optimization targets of the technical units for all the technical units.

Within the context of the invention, a technical unit can be understood to mean any electrical apparatus that can be electrically connected to the distribution network. Therefore, the plurality of technical units can encompass at least one electrical load and/or at least one electrical generator and/or at least one electrical store. A respective example of an electrical unit is a power station, a solar installation, a cogeneration pump, an electrically drivable motor vehicle, a charging station for electrical motor vehicles, a building, an industrial installation, a household, a stationary store for electrical energy.

To coordinate the technical units, there is provision for the central control apparatus. This can coordinate the operation of the plurality of technical units in a pool on an electrical distribution network. To this end, the control apparatus according to the invention has a computing device configured to perform an embodiment of the method according to the invention. To this end, the computing device can encompass at least one microprocessor. The method can be realized in the form of a control program for the computing device. The data to be transmitted or interchanged between the control apparatus and the technical units (flexibility data, stimulus functions, schedules) can be transmitted by means of a respective communication connection, for example. The communication connection can be provided e.g. on the basis of the Internet and/or a mobile radio connection.

The invention also includes an electrical apparatus that can be operated as a technical unit on an electrical distribution network. As a technical unit, the electrical apparatus can therefore be controlled by means of the control apparatus according to the invention. The apparatus is designed to exchange electrical power with the distribution network as an electrical load or generator or store. The apparatus is furthermore configured to transmit to an embodiment of the (central) control apparatus according to the invention flexibility data that indicate, for at least one time interval, in the manner described, a respective power range within which an electrical power exchanged between the apparatus and the distribution network is permitted to vary or probably varies. In addition, the apparatus is configured to receive from the control apparatus at least one individual stimulus function that indicates, for the at least one time interval indicated by the apparatus, a time characteristic of a predetermined orientation variable (for example monetary costs, CO2 emissions, proportion of renewable energies, actual schedule) so that the apparatus can plan a schedule, that is to say a power exchange for the at least one indicated time interval. The apparatus is furthermore configured to respond to the at least one individual stimulus function by planning a schedule, by planning a time characteristic of the power exchange for the at least one time interval indicated by the apparatus in accordance with a local optimization criterion of the apparatus (for example cost minimization, wear minimization, noise minimization, CO2 emissions minimization, maximization of the proportion of renewable energies) and by transmitting said time characteristic to the control apparatus as a schedule.

The invention also includes developments of the electrical apparatus, as are described in connection with the developments of the method according to the invention. The applicable developments of the electrical apparatus are therefore not described again at this juncture.

Therefore, the electrical apparatus thus forms the counterpart of the central control apparatus described, so that by and large the control apparatus and multiple instances of the electrical apparatuses can perform the method according to the invention. The invention therefore also includes a combination of the control apparatus according to the invention and of multiple electrical apparatuses according to the invention, which results in a system according to the invention.

Further features of the invention are obtained from the claims, the figures and the description of the figures. The features and feature combinations cited in the description above and the features and feature combinations cited in the description of the figures below and/or shown in the figures alone are usable not only in the respectively indicated combination but also in other combinations or on their own.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
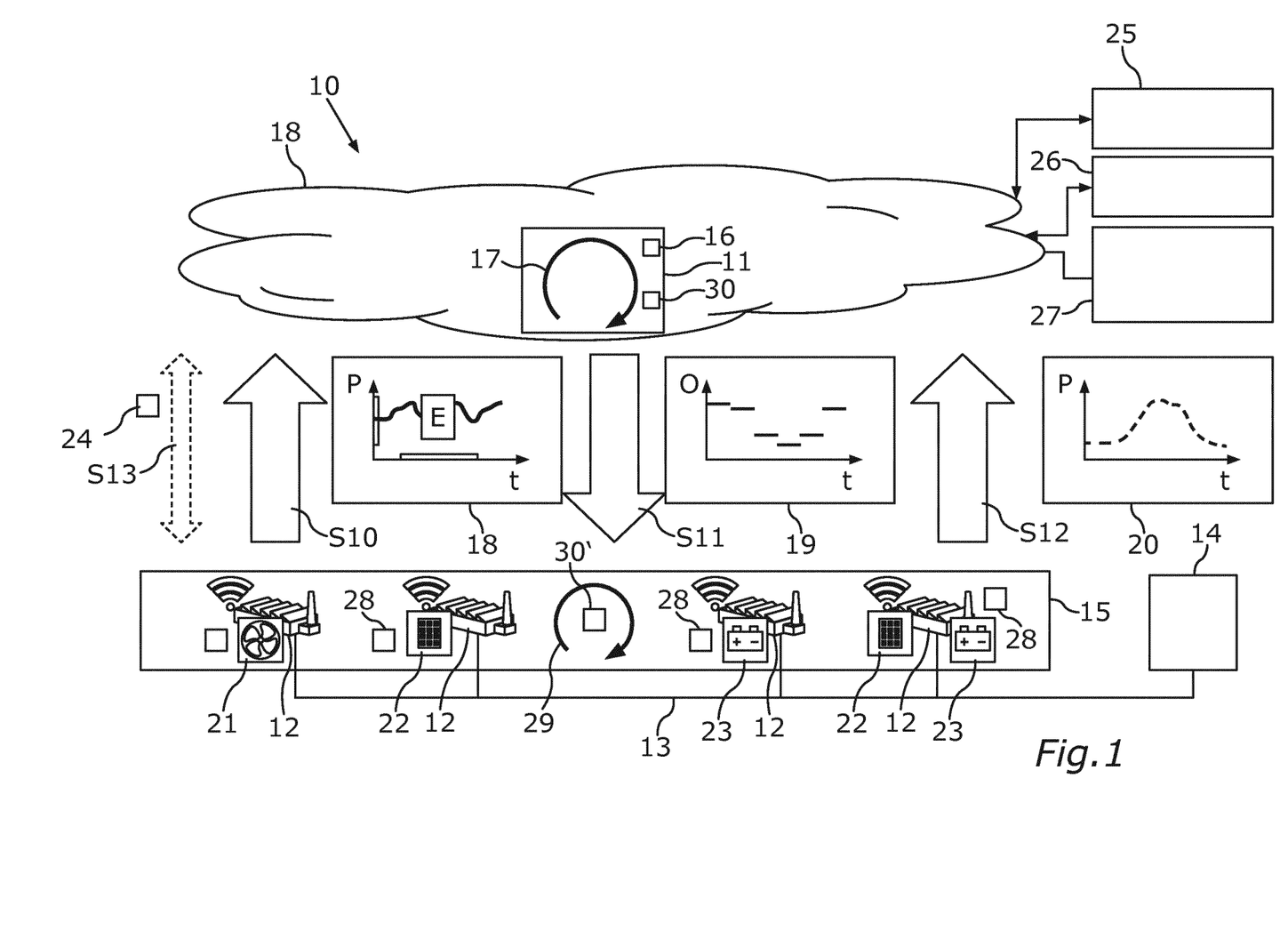
FIG. 1 is a schematic depiction of an embodiment of the system according to the invention.

FIG. 1 shows a system 10 that can have a central control apparatus 11 and multiple technical units 12. The technical units 12 can be connected to an electrical distribution network 13, to which, additionally, further technical units 14 can be connected, which are not part of the system 10, however. The technical units 12 that are part of the system 10 are operated as a pool 15 vis-à-vis the distribution network 13, i.e. the pool 15 has an overall schedule 16 ascertained for it that the pool 15 needs to comply with vis-à-vis the distribution network 13. The overall schedule 16 can be ascertained by the control apparatus 11 in a coordination cycle 17.

To this end, the server apparatus 11 can be designed for example as a server of the Internet 18 and can communicate with the individual technical units 12 by means of communication connections in a manner known per se. In the coordination cycle 17, the control apparatus 11 can receive respective flexibility data 18 from each technical unit 12 in a step S10, can then use the flexibility data 18 to produce a respective stimulus function 19 for each technical unit 12 and can transmit said stimulus function to the respective technical unit 12 in a step S11. Each technical unit 12 can then take the stimulus function 19 as a basis for then producing a respective individual schedule 20, which can in turn be communicated or provided to the control apparatus 11 in a step S12.

Each technical unit 12 can for example provide for an electrical power consumption 21 or the electrical power generation 22 or an electrical buffer-storage 23 of energy or else a combination of two or more of said functions, that is to say for example the generation 22 and the buffer-storage 23, as depicted for a technical unit 12 in FIG. 1.

The control apparatus 11 can additionally ascertain respective operating state data 24 cyclically or at predetermined times, independently of the coordination cycle 17, in a state monitoring step S13. As a result, the control apparatus can detect a deviation by a technical unit 12 from its schedule 20 and can then restart the coordination cycle 17, for example.

The control apparatus 11 can furthermore ascertain for example the price of electrical power or electrical energy from an energy market 25 or can receive data from, or deliver data to, aggregators 26, which are then able for example to provide a network service or an energy product on the basis of the electrical power of the pool 15, for example providing primary control power. The control apparatus 11 can also receive or provide forecasts of the weather and/or of the energy consumption of the at least one pool-external technical unit 14 and/or of energy costs from or to an online service 27.

Each technical unit 12 has relevant local premises 28 for the operation thereof, which the control apparatus 11 does not need to know or control, however. Rather, there exists for each technical unit 12 a planning cycle 29 of its own in which the technical unit 12 plans its respective schedule 20 while complying with or taking into consideration its local premises 28. A local premise 28 is a respective prescribed condition or planning target for a local orientation variable, such as for example wear minimization, consumption minimization, noise minimization, compliance with the switching time. Additionally, each technical unit 12 also takes into consideration the stimulus function 19 provided for it, however, e.g. the trend in the costs for the purchase of power or the price of delivered power.

The control apparatus 11 can therefore influence this planning of the schedule 20 of each technical unit 12 by means of its stimulus function 19 to the effect that a pool-wide, predetermined optimization target 30 of the pool 15 is also met.

There follows a description of how the flexibility data 18 can be used to form the stimulus function 19 for each technical unit.

Figure 2:
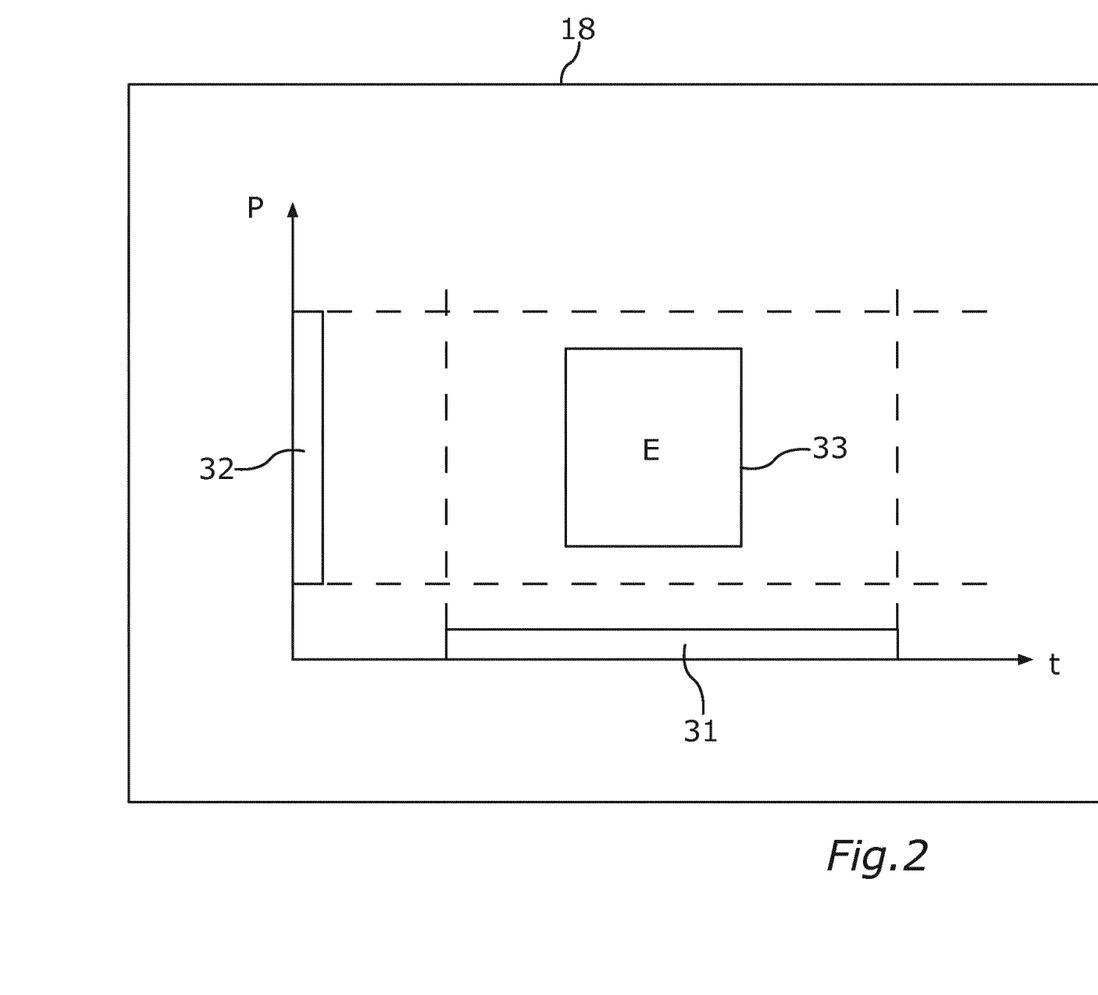
FIG. 2 is a graph to illustrate flexibility data.

In this regard, FIG. 2 once again illustrates a graph representing flexibility data 18. A power P for a future power exchange between a technical unit 12 and the distribution network 13 is depicted over time t. If the technical unit 12 has flexibility when planning its schedule 20, it can indicate, for a time interval 31, the power range 32 within which the power to be exchanged is permitted to vary or probably varies. This can be dependent for example on what minimum and maximum power the technical unit 12 is able to exchange. The flexibility data 18 can furthermore indicate a constraint 33 for the total electrical energy E to be exchanged in time interval 31.

Figure 3:
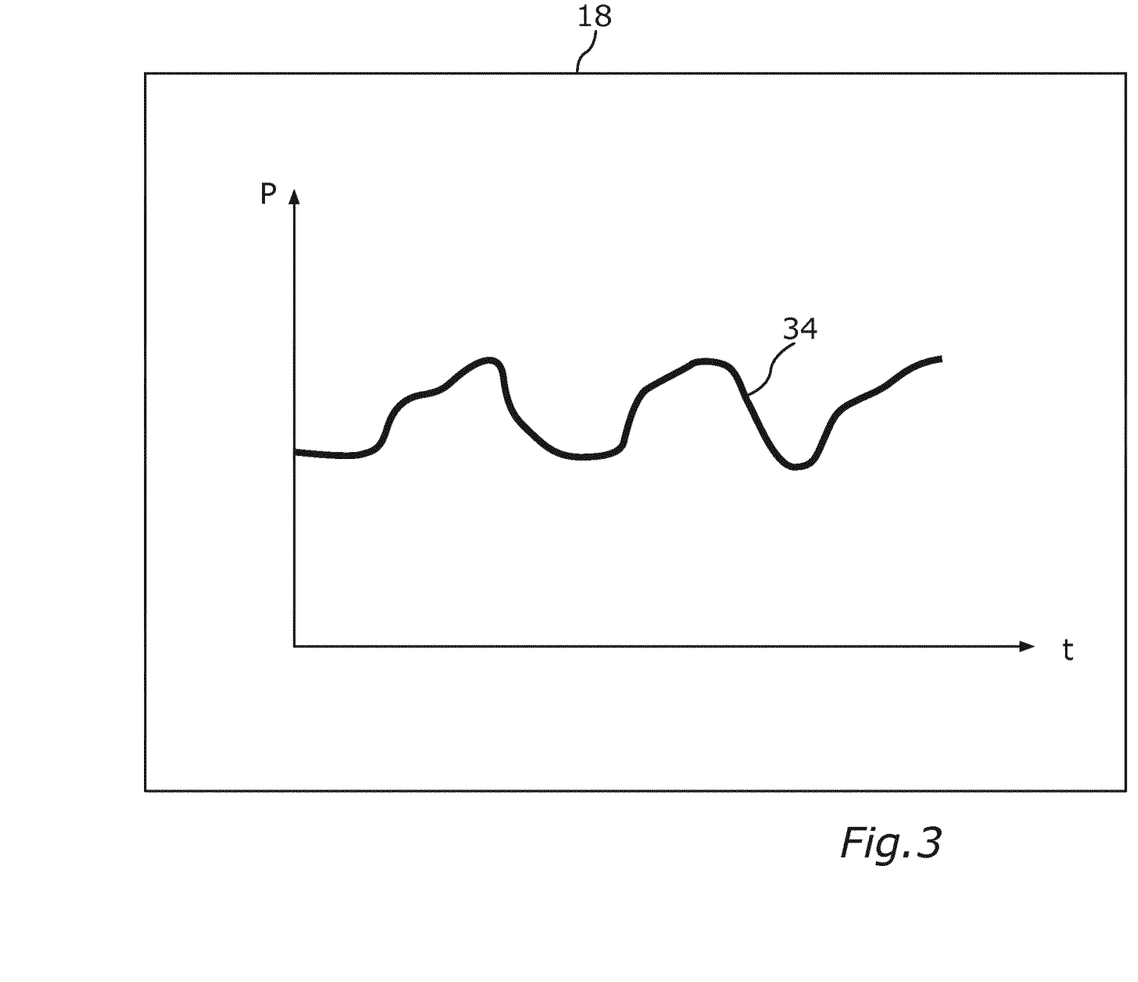
FIG. 3 is a graph to illustrate forecast data with forecast values.

FIG. 3 shows that how the flexibility data 18 can indicate a forecast 34 with forecast values of the power P over time t when a technical unit 12 has no flexibility. The flexibility can be absent for example if a technical unit 12 needs to comply with or adopt predetermined operating points over time t.

Figure 4:
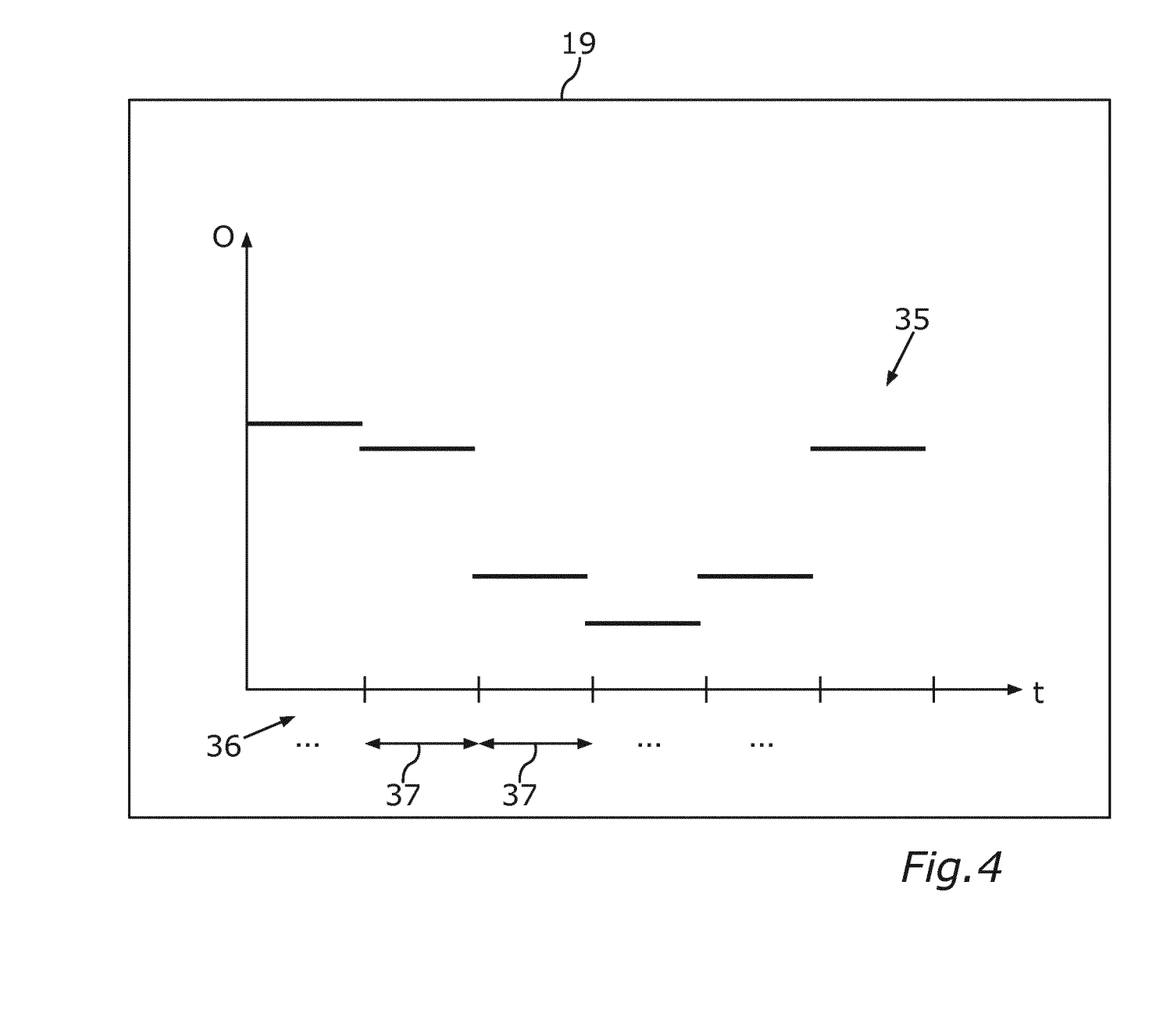
FIG. 4 is a graph to illustrate a stimulus function.

FIG. 4 illustrates how the stimulus function 19 can define a value for an orientation variable O over time t for different times in each case, so that a time characteristic 35 of the orientation variable O is obtained. There can be provision for a time frame 36 comprising increment intervals 37 in order to describe the orientation variable O over time t. An increment interval 37 can describe a period of 15 minutes, for example. The orientation variable O can be for example the monetary costs or the monetary remuneration for the power exchange based on a power unit (for example 1 kW) or an energy unit (e.g. 1 kWh), the $CO_2$ emissions per power unit, the proportion of regenerative energy or else an actual power value P.

Figure 5:
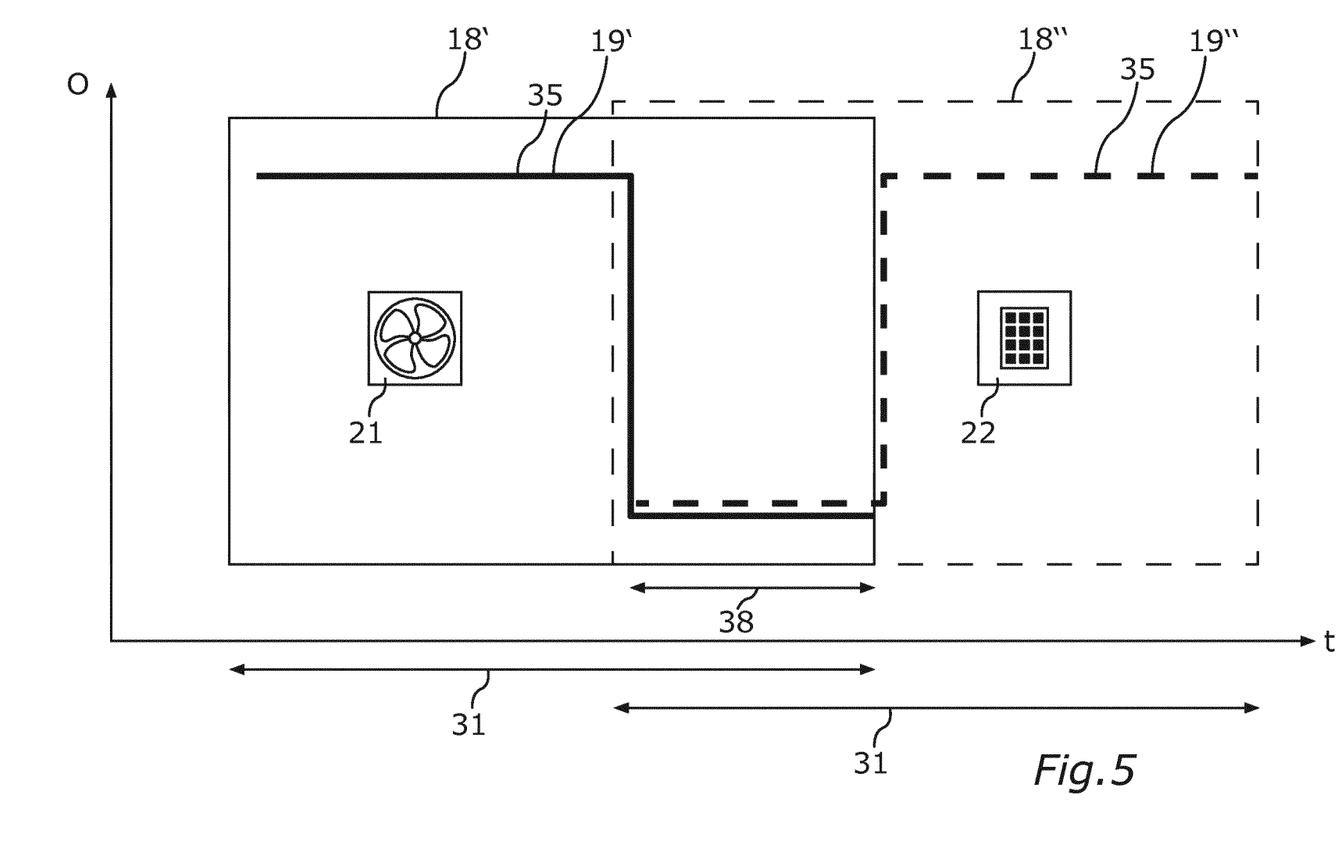
FIG. 5 is a graph to illustrate the formation of a stimulus function.

FIG. 5 illustrates how stimulus functions 19', 19" of two different technical units 12 can be ascertained and hence the technical units 12 can be coordinated. To this end, flexibility data 18', 18" of the two technical units 12 are depicted as a graph over time t. A subrange 38 is obtained, in which the two time intervals 31 that have been indicated by the technical units 12 overlap. It should be assumed that the global optimization target 30 states that the proportion of electrical power that is exchanged with the pool-external, at least one technical unit 14 is supposed to be minimized. Furthermore, it can be assumed that the flexibility data 18' indicate energy consumption 21 and the flexibility data 18″ indicate energy generation 22. In the subrange 38, the energy generation 22 can now compensate for the energy consumption 21 within the pool 15, that is to say internally in the pool. Accordingly, the time characteristic 35 of the stimulus functions 19′, 19″ is adapted to the effect that a low value is obtained for the orientation variable costs, for example, in the subrange 38, whereas the time characteristic 35 for the optimization variable costs assumes a high value outside the subrange 38. If the time characteristic 35 of the respective stimulus function 19′ 19″ is now transferred to the respective technical unit 12, the latter will concentrate the energy it exchanges with the distribution network 13 into the subrange 38 in its planning cycle 29.

Figure 6:
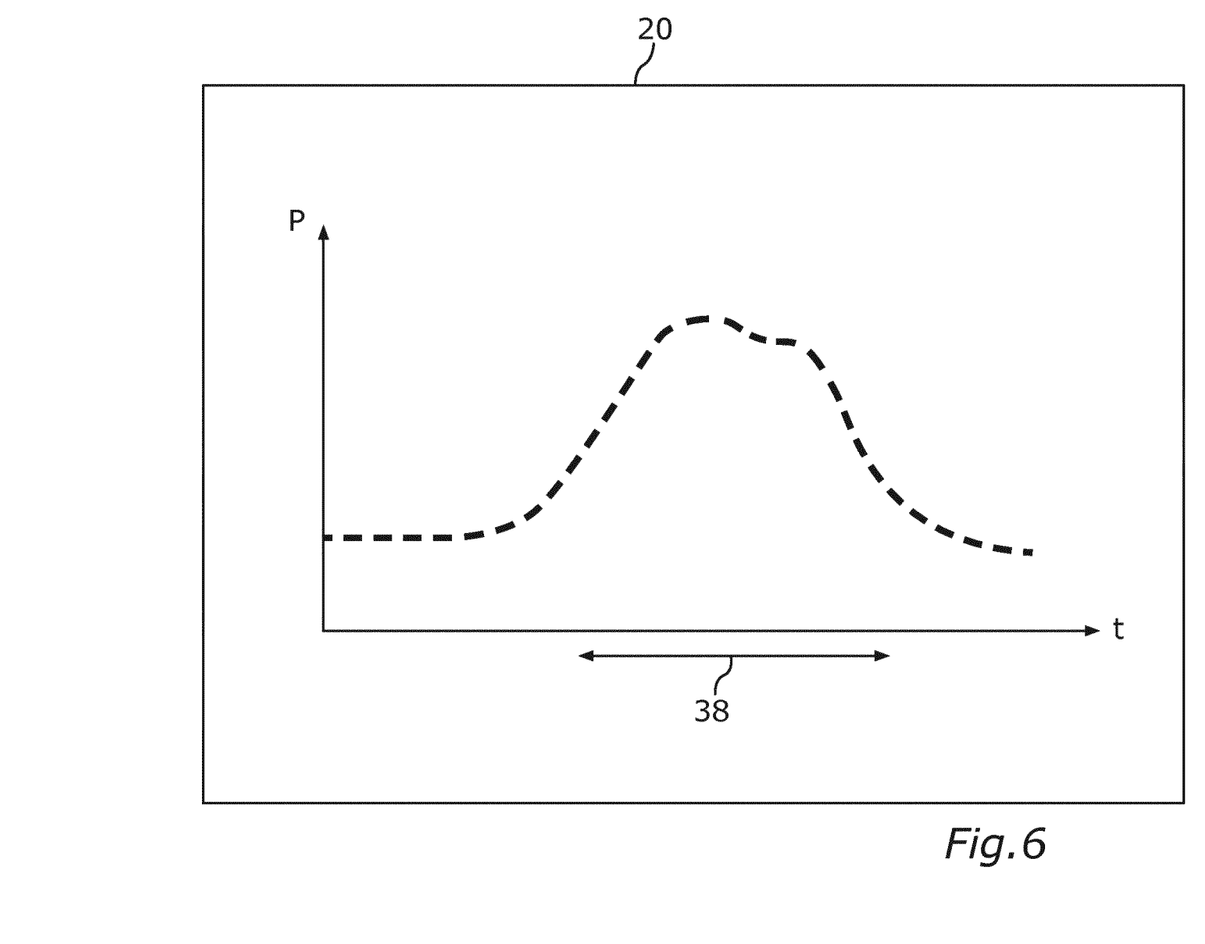
FIG. 6 is a graph to illustrate a schedule.

The result of the planning cycle 29 is, as depicted in exemplary fashion in FIG. 6, the schedule 20 of a technical unit 12, said schedule depicting, over the time t, the planned power P to be exchanged, said schedule then being maximized for the subrange 38 in the example described.

The control apparatus 11 can combine all of the schedules 20 and produce the overall schedule 16 therefrom by balancing the schedules 20, so that absent power or excess power can be exchanged with the at least one pool-external technical unit 14 via the distribution network 13. The unit 14 can encompass a power station or a city or a household or multiple households, for example. The costs and/or remuneration for pool-external energy or power can be ascertained by the control apparatus 11 on the basis of data of the energy markets 25 or energy aggregators 26 or from the forecasts 27, for example.

So that the technical units 12 can each perform the planning cycle 29 and communicate with the control apparatus 11, each technical unit 12 can have a control unit for example on the basis of the technology of the Internet of things. Each technical unit 12 can use such a control unit to take into consideration its local premises 28 when optimizing operation. The control apparatus 11 then delivers only stimuli in regard to for example costs, CO2 emissions, the proportion of renewable energies in the form of target function coefficients or constraints that affect the optimization process or the optimization function in the technical units 12 as a stimulus function 18. Each technical unit processes the stimulus function 18, optimizes its schedule 20 taking into consideration the local premises 28 and returns the final schedule 20 to the control apparatus 11.

A local premise 28 of this kind is thus a local orientation variable for planning the power exchange of a technical unit 12. The local planning cycle 29 then produces the schedule 20 in accordance with a local optimization target 30′, wherein local premises 28 can be binding, that is to say must be complied with by the schedule 20.

The control apparatus 11 then controls or monitors the compliance with the local schedule 20 on the basis of the operating state data 24 and records deviations, in order thereby to react to unexpected changes in the operating behavior of a technical unit 12 for example by performing a coordination cycle 17 again.

It is thus possible to examine local changes, for example the availability of a technical unit 12, and global changes (for example the change in the energy price on the energy market 25). In the event of changes, it is possible to renegotiate into a coordination cycle 17 in automated fashion without having to take action in the operation of the technical units 12 by means of the control apparatus 11.

Multiple technical units 12 are thus optimized to produce a pool 15 and are therefore e.g. a virtual power station in relation to the distribution network 13, which can provide a binding overall schedule 16 for example on the energy market 25 or for an aggregator 26 or can act as a network service provider.

Overall, the example shows how the invention can provide distributed management for the power-economics optimization of technical units or assets.

LIST OF REFERENCE SIGNS

10 System
11 Control apparatus
12 Technical unit
13 Distribution network
14 Pool-external technical unit
15 Pool
16 Overall schedule
17 Coordination cycle
18 Flexibility data
19 Stimulus function
20 Schedule
21 Energy consumption
22 Energy generation
23 Energy storage
24 Operating state data
25 Energy market
26 Energy aggregator
27 Forecasts
28 Local premises
29 Planning cycle
20 Optimization target of the pool
30′ Local optimization target
31 Time interval
32 Power range
33 Constraint
34 Forecast
35 Time characteristic
36 Time frame
37 Increment intervals
38 Subrange
E Energy
S10 Step
S11 Step
S12 Step
S13 Step
O Orientation variable
P Power The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a plurality of technical units as a pool on an electrical distribution network, comprising:
ascertaining, via a central control apparatus in at least one coordination cycle, on the basis of a predetermined optimization target of the pool, for each unit, at least one respective individual stimulus function that indicates, for at least one time interval indicated by the unit, a time characteristic of a predetermined orientation variable for planning a power exchange of an electrical power exchanged between the unit and the distribution network, and providing said stimulation function to the respective unit;

receiving, via the central control apparatus in the at least one coordination cycle, from each unit, in response to the at least one individual stimulus function, a respective schedule describing, for the at least one time interval indicated by the unit, a time characteristic of the power exchange planned in accordance with a local optimization target of the unit; and forming, via the central control apparatus in the at least one coordination cycle, from the schedules of the units an overall schedule for the pool that indicates a planned power exchange of the pool with at least one pool-external technical unit, wherein to ascertain the stimulus function, the central control apparatus receives from each technical unit respective flexibility data containing an indication, for the at least one time interval, of a respective power range within which the electrical power exchanged between the unit and the distribution network is permitted to vary or will probably vary, wherein in the case of a technical unit having flexibility, the power range is a power band indicating multiple possible power values for a given time, and wherein in the case of a technical unit without flexibility, the power range indicates a respective forecast value for the at least one time interval, and the stimulus function is ascertained from the respective flexibility data of each unit.

2. The method according to claim 1, wherein
the stimulus function indicates a time series having values of the orientation variable for increment intervals of a predetermined time frame.

3. The method according to claim 1, wherein
the respective orientation variable of the at least one stimulus function is one of the following: monetary costs, $CO_2$ consumption, proportion of regenerative energy, a proposed power value for a schedule.

4. The method according to claim 1, wherein
the optimization target of the pool provides for the respective orientation variable to be kept within a predetermined target range on a pool-wide basis.

5. The method according to claim 1, wherein
the flexibility data additionally contain a constraint indicating the total amount of energy that needs to be exchanged by the power exchange in the at least one time interval.

6. The method according to claim 1, wherein
the at least one coordination cycle is performed: when the operation of the units in the pool is initialized, when the technical units operated in the pool change, and/or when the at least one orientation variable changes.

7. The method according to claim 1, wherein
in the case of the at least one technical unit, the local optimization target encompass taking into consideration a local premise comprising a switching time to be observed, a minimization of wear, and/or a maximum permissible noise level.

8. The method according to claim 1, wherein
the technical units encompass: at least one electrical load, at least one electrical generator, and/or at least one electrical store.

9. A control apparatus for coordinating operation of a plurality of technical units in a pool on an electrical distribution network, wherein the control apparatus has a computing device configured to:

ascertain, via a central control apparatus in at least one coordination cycle, on the basis of a predetermined optimization target of the pool, for each unit, at least one respective individual stimulus function that indicates, for at least one time interval indicated by the unit, a time characteristic of a predetermined orientation variable for planning a power exchange of an electrical power exchanged between the unit and the distribution network, and provide said stimulation function to the respective unit;

receive, via the central control apparatus in the at least one coordination cycle, from each unit, in response to the at least one individual stimulus function, a respective schedule describing, for the at least one time interval indicated by the unit, a time characteristic of the power exchange planned in accordance with a local optimization target of the unit; and form, via the central control apparatus in the at least one coordination cycle, from the schedules of the units an overall schedule for the pool that indicates a planned power exchange of the pool with at least one pool-external technical unit, wherein to ascertain the stimulus function, the central control apparatus receives from each technical unit respective flexibility data containing an indication, for the at least one time interval, of a respective power range within which the electrical power exchanged between the unit and the distribution network is permitted to vary or will probably vary, wherein in the case of a technical unit having flexibility, the power range is a power band indicating multiple possible power values for a given time, and wherein in the case of a technical unit without flexibility, the power range indicates a respective forecast value for the at least one time interval, and the stimulus function is ascertained from the respective flexibility data of each unit.

10. An electrical apparatus for operation as a technical unit on an electrical distribution network, wherein the apparatus is designed to exchange electrical power with the distribution network, as an electrical load or generator or energy store, wherein the electrical apparatus is configured to:

transmit, to a control apparatus according to claim 9, flexibility data that are used to indicate, for at least one time interval, a respective power range within which an electrical power exchanged between the apparatus and the distribution network is permitted to vary or probably varies, wherein in the case of a technical unit having flexibility, the power range is a power band indicating multiple possible power values for a given time, and wherein in the case of a technical unit without flexibility, the power range indicates a respective forecast value for the at least one time interval, receive from the control apparatus at least one individual stimulus function indicating, for the at least one time interval indicated by the apparatus, a time characteristic of a predetermined orientation variable for planning the power exchange, respond to the at least one individual stimulus function by transmitting to the control apparatus a schedule for the at least one time interval indicated by the apparatus, which schedule is planned in accordance with a local optimization target of the apparatus and indicates a time characteristic of the power exchange for the at least one time interval.

11. A system, comprising:
a plurality of technical units in a pool on an electrical distribution network;
a control apparatus for coordinating operation of the plurality of technical units in the pool on the electrical distribution network; wherein the control apparatus has a computing device configured to:
ascertain, via a central control apparatus in at least one coordination cycle, on the basis of a predetermined optimization target of the pool, for each unit, at least one respective individual stimulus function that indicates, for at least one time interval indicated by the unit, a time characteristic of a predetermined orientation variable for planning a power exchange of an electrical power exchanged between the unit and the distribution network, and provide said stimulation function to the respective unit;
receive, via the central control apparatus in the at least one coordination cycle, from each unit, in response to the at least one individual stimulus function, a respective schedule describing, for the at least one time interval indicated by the unit, a time characteristic of the power exchange planned in accordance with a local optimization target of the unit; and
form, via the central control apparatus in the at least one coordination cycle, from the schedules of the units an overall schedule for the pool that indicates a planned power exchange of the pool with at least one pool-external technical unit,
wherein
to ascertain the stimulus function, the central control apparatus receives from each technical unit respective flexibility data containing an indication, for the at least one time interval, of a respective power range within which the electrical power exchanged between the unit and the distribution network is permitted to vary or will probably vary,
wherein in the case of a technical unit having flexibility, the power range is a power band indicating multiple possible power values for a given time, and wherein in the case of a technical unit without flexibility, the power range indicates a respective forecast value for the at least one time interval,
and the stimulus function is ascertained from the respective flexibility data of each unit; and
an electrical apparatus for operation as one of the plurality of technical units on the electrical distribution network, wherein the apparatus is designed to exchange electrical power with the distribution network, as an electrical load or generator or energy store,
wherein
the electrical apparatus is configured to:
transmit to the control apparatus the flexibility data that are used to indicate, for at least one time interval, a respective power range within which an electrical power exchanged between the apparatus and the distribution network is permitted to vary or probably varies,
wherein in the case of a technical unit having flexibility, the power range is a power band indicating multiple possible power values for a given time, and wherein in the case of a technical unit without flexibility, the power range indicates a respective forecast value for the at least one time interval,
receive from the control apparatus at least one individual stimulus function indicating, for the at least one time interval indicated by the apparatus, a time characteristic of a predetermined orientation variable for planning the power exchange,
respond to the at least one individual stimulus function by transmitting to the control apparatus a schedule for the at least one time interval indicated by the apparatus, which schedule is planned in accordance with a local optimization target of the apparatus and indicates a time characteristic of the power exchange for the at least one time interval.

* * * * *